United States Patent
Kho et al.

(10) Patent No.: US 10,011,743 B2
(45) Date of Patent: Jul. 3, 2018

(54) DIELECTRIC ADHESIVE FILM FOR ELECTRONIC PAPER DISPLAY DEVICE

(75) Inventors: Dong Han Kho, Daegu-si (KR); Sang Hoon Lee, Gyeongsangbuk-do (KR); Chang Ik Hwang, Daegu-si (KR); Yeon Soo Kim, Gyeonggi-do (KR)

(73) Assignee: TORAY ADVANCED MATERIALS KOREA, INC., Gyeongsan, Gbuk-Do (KR)

( * ) Notice: Subject to any disclaimer, the term of this patent is extended or adjusted under 35 U.S.C. 154(b) by 108 days.

(21) Appl. No.: 14/395,240

(22) PCT Filed: May 21, 2012

(86) PCT No.: PCT/KR2012/003987
§ 371 (c)(1),
(2), (4) Date: Oct. 17, 2014

(87) PCT Pub. No.: WO2013/157691
PCT Pub. Date: Oct. 24, 2013

(65) Prior Publication Data
US 2015/0118432 A1  Apr. 30, 2015

(30) Foreign Application Priority Data
Apr. 19, 2012 (KR) .................. 10-2012-0041135

(51) Int. Cl.
*C09J 7/38* (2018.01)
*C09J 175/04* (2006.01)
(Continued)

(52) U.S. Cl.
CPC .......... *C09J 7/385* (2018.01); *C08G 18/6229* (2013.01); *C08G 18/672* (2013.01); *C09J 7/00* (2013.01);
(Continued)

(58) Field of Classification Search
CPC ...... C09J 7/0235; C09J 133/08; C09J 133/10; C09J 133/068; C09J 133/14;
(Continued)

(56) References Cited

U.S. PATENT DOCUMENTS

| 4,699,841 A | * | 10/1987 | Kundinger | .............. B32B 27/28 |
| | | | | 428/332 |
| 5,688,581 A | * | 11/1997 | Chagnon | ................... B32B 7/06 |
| | | | | 156/230 |

(Continued)

FOREIGN PATENT DOCUMENTS

| EP | 0398577 A1 | * | 11/1990 | ........... C08K 5/0025 |
| JP | 2004-535599 | | 11/2004 | ............... G02F 1/17 |

(Continued)

OTHER PUBLICATIONS

International Search Report in PCT/KR2012/003987, dated Mar. 27, 2014, with English Translation.

*Primary Examiner* — Scott R. Walshon
(74) *Attorney, Agent, or Firm* — Harness, Dickey & Pierce, P.L.C.

(57) ABSTRACT

A dielectric adhesive film for an electronic paper display device, by which the operating performance of a flexible display device is excellent even applying a high voltage when the flexible display device is operated, by controlling a dielectric constant with respect to an adhesive film for attaching a lower electrode to which a voltage is applied with an image upper electrode on which particles, which possess electric charges with various colors that change according to an applied voltage, are coated to adjust the electric charges of the adhesive film in the thickness direction to thereby minimize loss of the applied voltage while maintaining an adhesive property and reliability.

12 Claims, 2 Drawing Sheets

(51) Int. Cl.

| | | |
|---|---|---|
| *C08G 18/62* | (2006.01) | |
| *C08G 18/67* | (2006.01) | |
| *C09J 133/06* | (2006.01) | |
| *C09J 9/00* | (2006.01) | |
| *C09J 7/00* | (2018.01) | |
| *C09J 133/08* | (2006.01) | |
| *G02F 1/17* | (2006.01) | |
| *G02F 1/167* | (2006.01) | |

(52) U.S. Cl.
CPC ............ *C09J 9/00* (2013.01); *C09J 133/068* (2013.01); *C09J 133/08* (2013.01); *C09J 175/04* (2013.01); *G02F 1/167* (2013.01); *G02F 1/172* (2013.01); *C09J 2203/318* (2013.01); *C09J 2433/00* (2013.01); *C09J 2467/005* (2013.01); *G02F 2202/28* (2013.01); *Y10T 428/1476* (2015.01)

(58) Field of Classification Search
CPC ............ C09J 2433/00; C09J 2467/005; C09J 2203/318; C09J 7/385; G02F 1/172; G02F 1/167; G02F 1/15; G02F 1/133308
See application file for complete search history.

(56) References Cited

U.S. PATENT DOCUMENTS

| | | | | |
|---|---|---|---|---|
| 6,585,849 | B2 * | 7/2003 | Smith ..................... | C09J 9/00 156/326 |
| 7,012,735 | B2 * | 3/2006 | Honeyman ............... | B32B 7/06 359/242 |
| 7,462,663 | B2 * | 12/2008 | Kim ....................... | C09J 133/06 524/261 |
| 7,535,624 | B2 * | 5/2009 | Amundson ............... | C08K 3/22 345/107 |
| 7,572,491 | B2 | 8/2009 | Wang et al. ................ | 428/1.5 |
| 8,493,319 | B2 * | 7/2013 | Gila ....................... | G02F 1/167 345/107 |
| 2003/0011867 | A1 | 1/2003 | Loxley ..................... | 359/296 |
| 2003/0025855 | A1 | 2/2003 | Holman et al. .............. | 349/86 |
| 2006/0279922 | A1 * | 12/2006 | Cho ........................ | C09J 133/26 361/679.01 |
| 2010/0028564 | A1 * | 2/2010 | Cheng ..................... | G02B 5/3025 428/1.1 |
| 2010/0239793 | A1 * | 9/2010 | Andrews .................. | B41M 5/46 428/32.69 |
| 2012/0094037 | A1 * | 4/2012 | Banba ...................... | C09J 7/00 428/1.5 |
| 2012/0320001 | A1 * | 12/2012 | Gila ....................... | G02F 1/167 345/204 |
| 2013/0211028 | A1 | 8/2013 | Shinike et al. ............ | 526/307.5 |

FOREIGN PATENT DOCUMENTS

| | | | | |
|---|---|---|---|---|
| JP | 2004-536336 | | 12/2004 | ........... G02F 1/1339 |
| JP | 2006-521586 | | 9/2006 | ............. G02F 1/167 |
| JP | 2010-168425 | | 8/2010 | ................ C09J 7/00 |
| KR | 10-2005-0101540 | | 10/2005 | ................ C09J 9/02 |
| KR | 10-2006-0032111 | | 4/2006 | ............. G02F 1/167 |
| KR | 10-2006-0067006 | | 6/2006 | ............... G02F 1/15 |
| KR | 10-2007-0041197 | | 4/2007 | ............. G02F 1/167 |
| KR | 10-2008-0029837 | | 4/2008 | ............ C09L 123/06 |
| KR | 10-2010-0000630 | | 1/2010 | ............ C09J 133/04 |
| KR | 10-2011-0032357 | | 3/2011 | ............. G02F 1/167 |
| KR | 10-2012-0014215 | | 12/2011 | ................ C09J 7/02 |
| WO | WO 2010147047 | A1 * | 12/2010 | ................ C09J 7/00 |
| WO | WO 2012/023567 | | 2/2012 | ............. C09J 133/24 |

\* cited by examiner

DIELECTRIC ADHESIVE FILM FOR ELECTRONIC PAPER DISPLAY DEVICE

CROSS-REFERENCE TO RELATED APPLICATIONS

This application is a national phase application of PCT Application No. PCT/KR2012/003987, filed on 21 May 2012, which claims benefit of Korean Patent Application 10-2012-0041135, filed on 19 Apr. 2012. The entire disclosure of the application identified in this paragraph is incorporated herein by reference.

TECHNICAL FIELD

The present invention relates to a dielectric adhesive film for an electronic paper display device, and more particularly to a dielectric adhesive film for an electronic paper display device, in which a lower electrode, to which a voltage is applied, and an image upper electrode coated with charged particles, of which colors are changed depending on the applied voltage, are attached to the adhesive film. In the present invention, a dielectric constant of the adhesive film is controlled, such that an electric charge in a thickness direction may be adjusted, thereby minimizing loss of the applied voltage while maintaining adhesive properties and reliability. Accordingly, driving performance of a flexible display device may be enhanced even without applying a high voltage when the display device is driven.

BACKGROUND

Recently, as networks are widely used, conventional printed documents are increasingly replaced with documents displayed on a flexible display device, which is widespread throughout the market of electronic publishing industry including the markets of books, magazines, and the like.

Users may view such documents through a cathode-ray tube (CRT) or a liquid crystal display (LCD) of a computer to read information in the documents. However, the CRT as or the LCD of a computer is a display device of a light emitting type, it is difficult for users to read information for a long time due to eye fatigue felt when using the display device for an extended period of time, and such documents may only be read in a place where a computer, an LCD, or the like is installed.

Although a portable display device may be used as an alternative with a widespread distribution of notebook type computers, the portable display device also uses a light emitting display with a backlight, causing a problem in that power consumption limits reading for an extended period of time.

Reflective type liquid crystal display devices that can be driven with low power consumption have been developed and released. However, in the white mode, reflective liquid crystal display devices have low reflectance, which leads to remarkably low visibility, and causes fatigue more easily compared to printed paper materials, such that it is unable to solve the problems described above, and may not be used for reading for an extended period of time.

In order to solve the above problems, the so-called electronic paper is being developed recently.

The electronic paper is a core element for implementing a flexible display, which makes a motion when an electromagnetic field is applied to a conductive material. That is, after distributing charged particles between thin film flexible substrates, data are expressed by changing arrangement of directions of the charged particles based on changes of polarities of the electromagnetic field.

In this case, if the arrangement of directions of the charged particles occurs at any polarity, an image is maintained as it is since positions of the particles are unchanged due to memory effect even though voltage is removed, thereby obtaining an effect of printing the image on a paper with ink. Accordingly, since the electronic papers does not have self-emitting light, visual fatigue is remarkably lowered, and thus it is possible to view documents with comfort like reading a real book. In addition, since flexibility and portability are secured by using a flexible substrate, the electronic paper is highly expected as a future flat panel display technique.

In addition, if an image is embodied once, it is maintained for an extended period of time as described above until the substrate is re-set, such that power consumption may be very low, and the electronic paper may be conveniently used as a portable display device.

As manufacturing cost of the electronic paper is extremely low compared to conventional flat panel displays, and background illumination or continuous recharge of battery is not required, the electronic paper may be driven with an extremely low energy, and thus they are remarkably superior in terms of energy efficiency.

With the advantages described above, the electronic paper is applicable to a variety of fields, including electronic books and newspapers having paper-like surfaces and mobile illustrations, reusable paper displays for cellular phones, disposable TV screens, electronic wallpapers, and the like, so that a vast potential market may be expected.

In a flexible display device such as the electronic paper described above, an upper electrode having charged particles of an image is required to be combined with a lower electrode to which voltage is applied, in which the flexible display device is manufactured by inserting an adhesive film between the two electrodes.

However, there may be a loss in driving voltage or inconsistent driving may occur due to the adhesive film, and a charged particle layer of image may be damaged due to a heating and pressing process in the process of manufacturing the adhesive film. Therefore, there is a need to manufacture an adhesive film having a low voltage loss, which may be accomplished by a uniform adhesive means of the adhesive film.

For example, Korean Laid-open Patent Publication No. 2006-0032111 discloses a method of bonding barrier ribs and a substrate in a thermal bonding method after transcribing an adhesive means on the top and bottom of a transparent electrode using adhesive means that have different transition temperatures.

However, since instability of the barrier ribs, a pigment, or a toner increases while they pass through the thermal bonding process twice, it is difficult to practically utilize the method.

Korean Laid-open Patent Publication No. 2006-0067006 discloses a bonding method using an ultraviolet lamp, in which an ultraviolet curing adhesive is used as an adhesive means. Further, Korean Patent No. 10-1030936 discloses an electrophoretic display, in which a fluid composition and a liquid crystal composition are used to form a sealing layer and an adhesive layer, which is made from a radiation-curable composition and attached to a second electrode layer (e.g., an electrode such as a thin film transistor (TFT)). However, filled-in pigment or toner are mixed with ultraviolet curable monomers, such that the pigment or toner may be fixed to the adhesive layer after a curing process, or an ultraviolet curing process may not occur. In addition, most of the pigment used in this method is unstable with ultraviolet rays, requiring a function of blocking ultraviolet rays from outside, making this bonding method unrealistic.

An attempt has been made to improve the problems of conventional thick adhesive films, as disclosed in Korean Laid-open Patent Publication No. 2007-0041197, in which an EVA adhesive is implemented as a thin film using a vacuum evaporation method. However, it is difficult to apply a desired amount of EVA adhesive, which is an organic material, at a desired position using the vacuum evaporation method.

Korean Laid-open Patent Publication No. 2011-0032357 discloses a technique for bonding barrier ribs and a substrate at a desired position using a tape configured with a flexible film placed in the middle and two adhesive layers attached on both sides of the flexible film. However, although the barrier ribs and the substrate may be attached at a desired position, a quality resolution on a display material may not be achieved using a double-sided tape.

In addition, due to strong adhesiveness, the adhesive layer applied to an electronic paper among the flexible displays described above does not allow a re-work on each material if the pigment or toner is defective at the time of attachment or if there is a problem in the upper or lower electrode. Accordingly, a loss occurred during manufacturing of the adhesive is enormous since relatively expensive thin film transistors (TFTs) cannot be used. Furthermore, the Korean Patent rarely discloses properties of an adhesive layer interposed between an upper or lower electrode, thereby failing to propose a method for overcoming a loss in the driving voltage.

Therefore, in an effort to solve the conventional problems, inventors of the present invention have produced the present invention, in which a lower electrode, to which voltage is applied, and an image upper electrode coated with charged particles, of which colors are changed depending on the applied voltage, are attached to the adhesive film, and dielectric characteristics are controlled by controlling a dielectric constant of an adhesive film, such that a resistance value in a thickness direction may be controlled, thereby manufacturing an adhesive film without a loss in the driving voltage.

Technical Problem

In order to solve the problems described above, the present invention provides a dielectric adhesive film for an electronic paper display device, which may minimize a loss in the driving voltage of a flexible display device while maintaining adhesive properties and reliability.

The object described above and other objects not described herein can be clearly understood from the following description by those skilled in the art.

TECHNICAL SOLUTION

The above object may be accomplished by a dielectric adhesive film for an electronic paper display device, in which the dielectric adhesive film is formed to attach an upper electrode coated with charged particles, and a lower electrode to which voltage is applied, and the adhesive film has a dielectric constant in a range of 2.0 to 10.0.

Here, in the adhesive film, a polyester-based high release sheet, an adhesive layer formed on a silicone release coating surface of the high release sheet, and a polyester-based low release sheet formed on the adhesive layer may be laminated.

The adhesive layer may preferably contain 70 to 95% by weight of an acrylic adhesive to impart adhesive characteristics and reliability, and 5 to 30% by weight of a resin for imparting dielectric characteristics to increase or to compensate for a dielectric constant.

A base resin used in the acrylic adhesive may preferably be an acrylate copolymer produced by copolymerizing 90 to 99.9% by weight of a monomer that does not have a cross-linkable functional group, and 0.1 to 10% by weight of a monomer having a cross-linkable functional group.

The resin for imparting dielectric characteristics may preferably be one or a mixture of two or more polymers selected from a group consisting of: polyurethane, polyurea, polycarbonate, polyamide, polyester, polycaprolactone, polyvinyl alcohol, polyether, a polyvinylacetate derivative, polyvinyl fluoride, polyvinylidene fluoride, an acrylic or methacrylic copolymer, a vinyl ether copolymer, a styrene copolymer, a diene copolymer, a siloxane copolymer, a cellulose derivative, gum arabic, an epoxy-based compound, and a phenol based compound.

The thickness of the adhesive layer may preferably be in a range of 4.0 μm to 50.0 μm.

In the adhesive layer, an electrical resistance value may preferably be in a range of $1.0 \times 10^4 \Omega$ to $9.9 \times 10^9 \Omega$ in a direction toward where an electric field is formed.

The monomer that does not have a cross-linkable functional group may preferably be one or a mixture of two or more monomers selected from a group consisting of: methyl (meth)acrylate, ethyl(meth)acrylate, n-propyl(meth)acrylate, n-butyl(meth)acrylate, pentyl(meth)acrylate, hexyl (meth)acrylate, cyclohexyl(meth)acrylate, 2-ethylhexyl (meth)acrylate, isooctyl(meth)acrylate, decyl(meth)acrylate, dodecyl(meth)acrylate, myristyl(meth)acrylate, palmityl (meth)acrylate, stearyl(meth)acrylate, n-tetradecyl(meth) acrylate; an acrylic monomer of acrylonitrile; or a biacrylic monomer containing vinyl acetate or styrene.

The monomer having a cross-linkable functional group may preferably be one or a mixture of two or more monomers selected from: an acrylic monomer containing any one hydroxy group selected from a group consisting of 2-hydroxy ethyl(meth)acrylate, 2-hydroxy propyl(meth)acrylate, 4-hydroxy butyl(meth) acrylate, 6-hydroxy hexyl(meth) acrylate, 2-hydroxy ethylene glycol(meth)acrylate, and 2-hydroxy propylene glycol(meth)acrylate; an acrylic monomer containing any one carboxyl group selected from a group consisting of (meth)acrylic acid, maleic acid, and fumaric acid; or any one nitrogen-containing acrylic monomer selected from a group consisting of acrylamide, N-vinyl pyrrolidone, and N-vinyl caprolactam.

The adhesive layer may preferably contain 0.05 to 5 parts by weight of one or a mixture selected from an epoxy-based cross-linking agent, aziridine-based cross-linking agent or a multi-functional isocyanate-based cross-linking agent, with respect to 100 parts by weight of a base resin produced using an acrylate copolymer.

The adhesive layer may further contain preferably one or more anti-static agents selected from a carbon nanotube, a conductive organic or inorganic particle, an organic or inorganic salt, and an ionic material, to impart dielectric characteristics.

SUMMARY

In the present invention, a resin for imparting dielectric characteristics of an adhesive film is controlled such that a dielectric constant may be controlled while maintaining adhesive properties and reliability, thereby controlling a resistance value in the thickness direction of an adhesive film, i.e. a resistance value in a direction toward where an electric field is formed.

In the present invention, a dielectric adhesive film for an electronic paper display device, in which a lower electrode, to which a voltage is applied, and an image upper electrode coated with charged particles, of which colors are changed depending on the applied voltage, are attached to the adhesive film; and a resistance value in a direction toward where an electric field is formed is controlled to be in a range of $1.0\times10^4 \Omega$ to $9.9\times10^9 \Omega$. As a result, a loss in the applied voltage may be minimized, and charged particles may be driven freely, with no effects on adhesive properties of the adhesive film. Accordingly, an effect on a driving voltage of a flexible display device as well as an electronic paper may be minimized with almost no loss of potential difference (voltage) when the flexible display device is driven, such that driving performance of a flexible display device may be enhanced even without applying a high voltage when the display device is driven.

DRAWINGS

DETAILED DESCRIPTION

Figure 1:
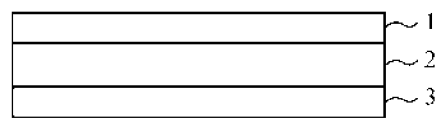
FIG. 1 is a cross-sectional view illustrating an example of a dielectric adhesive film for an electronic paper display device according to the present invention.

Hereinafter, the present invention will be described in detail with reference to examples and drawings. It will be apparent to one of ordinary skill in the art that these examples are merely illustrative to specifically explain the present invention, and the present invention is not limited thereto.

The invention is described more fully hereinafter with reference to the accompanying drawings, in which exemplary embodiments of the invention are shown. First, when adding reference numerals to elements of the drawings, it should be noted that like reference numerals are used for like elements if possible although like elements are shown in different drawings. In addition, in the description of the present invention, if it is determined that a detailed description of commonly-used configurations or functions related to the invention may unnecessarily obscure the subject matter of the invention, the detailed description will be omitted. In the drawings, the shape and size of elements in the drawings may be exaggerated for clarity.

FIG. 1 is a cross-sectional view illustrating an example of a dielectric adhesive film for an electronic paper display device according to the present invention. In the dielectric adhesive film for an electronic paper display device according to the present invention, a polyester-based high release sheet 1, an adhesive layer 2 formed on a silicone release coating surface of the high release sheet 1, and a polyester-based low release sheet 3 formed on the adhesive layer 2 are laminated.

The present invention provides the dielectric adhesive film for an electronic paper display device, in which a dielectric constant of the dielectric adhesive film is controlled to be in a range of 2.0 to 10.0 to attach an upper electrode coated with charged particles and a lower electrode to which voltage is applied.

Resistance of the adhesive film is highly affected by a dielectric constant, which is an electrical property of a dielectric body, such that an electric loss is sensitively changed depending on a dielectric constant of an adhesive film. If a dielectric constant of an adhesive film is less than 2.0, which means almost no electrical properties, an electric loss is increased when voltage is applied. By contrast, if a dielectric constant is 10.0 or higher, an organic material may not be used, and even when using an inorganic material of conductive particles, a large amount thereof should be added, which prohibits an electric field from being formed due to a high possibility that electric currents may flow between an upper electrode and a lower electrode, thereby losing adhesive properties of an adhesive film, and reliability of a product. Accordingly, in order to satisfy both adhesive reliability and proper electrical properties, a dielectric constant of an adhesive film is required to be in a range of 2.0 to 10.0, and may be optimized preferably in a range of 2.5 to lower than 10.0.

In order to obtain the optimal dielectric characteristics, a resin for imparting dielectric characteristics is required to be added to an adhesive layer, in which 5 to 30% by weight of the resin is added with respect to 70 to 95% by weight of an adhesive portion. If less than 5% by weight of the resin is added, the amount of resin is too low to improve dielectric characteristics, such that electrical properties may not be improved. By contrast, if more than 30% by weight of the resin is added, dielectric characteristics may be substantially improved, but adhesive reliability may be degraded as the resin for imparting dielectric characteristics is not related to adhesive properties, thereby losing product reliability. Further, an adhesive film may not be manufactured properly due to a problem in compatibility with an adhesive resin.

One or a mixture of two or more resins selected from a group consisting of a natural rubber resin, a synthetic rubber resin, an acrylic resin, and a silicone resin may be used as a base resin of the adhesive layer used in the adhesive film, among which an acrylic adhesive, which uses an acrylic resin having excellent optical properties, is used in the present invention.

An acrylate copolymer, which is produced by copolymerizing 90 to 99.9% by weight of a monomer that does not have a cross-linkable functional group and 0.1 to 10% by weight of a monomer having a cross-linkable functional group, is used as a base resin, and more preferably, a copolymer comprising 95 to 98% by weight of a monomer that does not have a cross-linkable functional group and 2 to 5% by weight of a monomer having a cross-linkable functional group is used as a base resin, in which the base resin may be manufactured to have a weight-average molecular weight of 800,000 or higher.

In this case, if the monomer that does not have a functional group is less than 90% by weight, there may be a problem in storage stability of the adhesive, since the number of functional group is relatively large, whereas if the monomer that does not have a functional group is higher than 99.9% by weight, a smooth reaction may not be expected, since reactivity of the functional group is significantly lowered, and the copolymer may not be regarded as proper, since other additives, such as a catalyst, are required.

The monomer that does not have a cross-linkable functional group is not specifically limited, as long as the monomer is, for example, a (meth) acrylic acid ester monomer, and (meth) acrylic acid ester having an alkyl group of 1 to 20 carbon atoms in the ester portion may be used.

Specifically, examples of the (meth) acrylic acid ester having an alkyl group of 1 to 20 carbon atoms in the ester portion include methyl(meth)acrylate, ethyl(meth)acrylate, n-propyl (meth)acrylate, n-butyl(meth)acrylate, pentyl(meth)acrylate, hexyl(meth)acrylate, cyclohexyl(meth)acrylate, 2-ethylhexyl(meth)acrylate, isooctyl(meth)acrylate, decyl(meth) acrylate, dodecyl(meth)acrylate, myristyl(meth)acrylate, palmityl(meth)acrylate, stearyl(meth)acrylate, n-tetradecyl (meth)acrylate, and the like. In addition to the above, one or a mixture of two or more monomers selected from an acrylic monomer of acrylonitrile or a biacrylic monomer containing vinyl acetate, or styrene may be used.

Further, the monomer having a cross-linkable functional group preferably includes at least one of a hydroxyl group, a carboxyl group, an amino group, and an amide group as a functional group. Specific examples thereof include one or a mixture of two or more monomers selected from: an acrylic monomer containing any one hydroxy group selected from a group consisting of 2-hydroxy ethyl(meth)acrylate, 2-hydroxy propyl(meth)acrylate, 4-hydroxy butyl(meth) acrylate, 6-hydroxy hexyl(meth)acrylate, 2-hydroxy ethylene glycol(meth)acrylate, and 2-hydroxy propylene glycol (meth)acrylate; an acrylic monomer containing any one carboxyl group selected from a group consisting of (meth) acrylic acid, maleic acid, and fumaric acid; or any one nitrogen-containing acrylic monomer selected from a group consisting of acrylamide, N-vinyl pyrrolidone, and N-vinyl caprolactam.

The acrylic adhesive layer described above contains 0.05 to 5 parts by weight of one or a mixture selected from an epoxy-based cross-linking agent or a multi-functional isocyanate-based cross-linking agent, with respect to 100 parts by weight of the base resin comprising an acrylate copolymer.

In this case, the cross-linking agent is mixed to enhance durability of the copolymer, and if contents of the cross-linking agent are less than 0.05 parts by weight, the cross-linking agent is unable to smoothly react with the functional group contained in the acrylic copolymer, and internal cohesiveness of the adhesive cannot be strengthened. By contrast, if contents of the cross-linking agent exceed 5 parts by weight, uniform properties cannot be exhibited, since storage stability is lowered while processing the adhesive, which is particularly undesirable since a retarder for delaying is required to be further added, or additional management for storing the adhesive at a low temperature is required in order to delay reactivity between the acrylic copolymer and a mixture of cross-linking agents.

In addition, the epoxy-based cross-linking agent used in the present invention may be an epoxy-based resin of a bisphenol A-epichlorohydrin type, ethylene glycol diglycidyl ether, polyethylene glycol diglycidyl ether, glycerin diglycidyl ether, glycerin triglycidyl ether, 1,6-Hexanediol diglycidyl ether, trimethylolpropane triglycidyl ether, diglycidyl aniline, N,N,N',N'-tetraglycidyl-m-xylenediamine, or a mixture thereof.

Moreover, the multi-functional isocyanante-based cross-linking agent used as another cross-linking agent may be a tolylene diisocyanate, diphenylmethane diisocyanate, hexamethylene diisocyanate, trimethylolpropane additive of the tolylene diisocyanate, or a mixture thereof.

The dielectric adhesive film of the present invention is manufactured to have a thickness of 4.0 μm to 50.0 μm. If the adhesive film is formed to be thinner than 4.0 μm, electrical properties may be superior, while release force is lowered, and interfacial fracture is caused in terms of adhesive reliability, thereby resulting in separation of electrode. By contrast, the adhesive film may be designed to be thick in order to impart adhesive reliability, but if the adhesive film is formed excessively thick to be more than 50.0 μm, electrical properties are degraded. Accordingly, in consideration of the trade-off relation between adhesive reliability and electrical properties, and in order to impart adhesive reliability while maintaining superior electrical properties, the thickness of the adhesive film is controlled to be 4.0 μm to 50.0 μm, and more preferably from 7.0 μm to 20.0 μm, thereby optimizing adhesive reliability and electrical properties.

Further, the adhesive layer used in the dielectric adhesive film for an electronic paper display device of the present invention is controlled to have a resistance value within a range of $1.0 \times 10^4 \Omega$ to $9.9 \times 10^9 \Omega$ in the thickness direction of the adhesive layer based on the thickness control described above. If the resistance value is lower than $1.0 \times 10^4 \Omega$ in the thickness direction of the adhesive layer, a resistance value between the upper and lower electrodes is too low to form an electric field. Therefore, a current may flow through the adhesive film, or electric shock may occur, requiring the adhesive layer to function as an insulator. If the resistance value is higher than $9.9 \times 10^9 \Omega$ in the thickness direction of the adhesive layer, although magnitude of the voltage applied to the lower electrode is changed, a voltage required to drive an image film configured with cells containing charged particles may not be obtained due to the extremely high resistance value, and thus, there will be a great loss in voltage. More preferably, it is reasonable to have a resistance value within a range of $1.0 \times 10^5 \Omega$ to $9.9 \times 10^7 \Omega$.

In addition, the acrylic adhesive layer may further contain one or more of anti-static agents selected from a conductive organic or inorganic particle, organic or inorganic salt, and an ionic material, and electric properties may be improved with the same thickness by changing dielectric characteristics.

Further, in the present invention, in order to enhance adhesive reliability and properties of the lower electrode, one or a mixture of two or more monomers selected from compounds used as an adhesive tackifier, a plasticizer, an anti-static agent, a surfactant, an antioxidant, a foaming agent, an antifoaming agent, a reinforcing agent, a coloring agent, or a filler may be further used as a general additive, in addition to the monomers and the hardeners of the acrylic adhesive.

Hereinafter, the present invention and resulting effects therefrom will be described in further detail through examples and comparative examples. These examples are merely illustrative and are not to be construed as limiting the scope of the present invention.

Example 1

Step 1: Manufacturing Base Resin of Acrylic Copolymer

A mixed composition was prepared by injecting monomers of 40 g of N-butyl acrylate, 0.5 g of acrylic acid, 0.5 g of glycidyl methacrylate, and 8 g of methyl acrylate into a chemical reactor of 500 ml, which was provided with a stirrer, a reflux condenser, a thermometer, and a nitrogen injection device, and adding 51 g of ethyl acetate as a solvent, and then polymerization of the mixed composition was processed. After the polymerization was complete, 63 g of ethyl acetate was added to the obtained polymer, and the polymer was diluted, so as to synthesize the desired base resin of acrylic copolymer to be in a solid content of 30% by weight.

Step 2: Manufacturing Adhesive Film

A mixed was manufactured by injecting 1.0 part by weight of 3-functional aziridine adduct as a hardener, and 10 parts by weight of a polyurethane rubber (dielectric constant of 6.20, which is generally in a range of 4.7 to 9.53) to 100 parts by weight of the acrylic copolymer, which is the base resin manufactured in step 1, and then diluting the base resin with methyl ethyl ketone and uniformly mixing them.

A uniform adhesive layer having a thickness of 20 was formed by coating and drying the mixture on the silicone release coating surface of a biaxially oriented polyethylene terephthalate film (product name of RPC 101, Toray Advanced Materials Inc.), which is a high release sheet.

Then, a polyethylene terephthalate film (product name of RPK-201, Toray Advanced Materials Inc.) was laminated as a low release sheet on the surface where the adhesive layer was formed, and the adhesive film was stored for 7 days at room temperature to be sufficiently matured, so as to manufacture the adhesive film.

Example 2

Example 2 was performed in the same manner as in Example 1, except that 20 parts by weight of a polyurethane rubber was added in the process of manufacturing an adhesive film in Example 1 (step 2).

Example 3

Example 3 was performed in the same manner as in Example 1, except that 10 parts by weight of bisphenol A epoxy (dielectric constant of 4.02) was added, without a polyurethane rubber, in the process of manufacturing an adhesive film in Example 1 (step 2).

Example 4

Example 4 was performed in the same manner as in Example 1, except that 20 parts by weight of bisphenol A epoxy (dielectric constant of 4.02) was added, without a polyurethane rubber, in the process of manufacturing an adhesive film in Example 1 (step 2).

Example 5

Example 5 was performed in the same manner as in Example 1, except that 0.1 parts by weight of a multi-wall carbon nanotube (Hanwha Nanotech Inc., CM-100) was further contained as an anti-static agent in the mixture in the process of manufacturing an adhesive film in Example 1 (step 2).

Comparative Example 1

Comparative example 1 was performed in the same manner as in Example 1, except that 2 parts by weight of a polyurethane rubber was added in the process of manufacturing an adhesive film in Example 1 (step 2).

Comparative Example 2

Comparative example 2 was performed in the same manner as in Example 1, except that 50 parts by weight of a polyurethane rubber was added in the process of manufacturing an adhesive film in Example 1 (step 2).

Composition and content of an adhesive layer manufactured in Examples 1 to 5 and Comparative examples 1 and 2 are shown in Table 1 below.

TABLE 1

| | | Example 1 | Example 2 | Example 3 | Example 4 | Example 5 | Comparative Example 1 | Comparative Example 1 |
|---|---|---|---|---|---|---|---|---|
| Content of acrylic copolymer (attaching portion) | | 100 | 100 | 100 | 100 | 100 | 100 | 100 |
| Dielectric additives | Polyurethane rubber | 10 | 20 | | | 10 | 2 | 50 |
| | Bisphenol A Epoxy | | | 10 | 20 | | | |
| | Carbon nanotube | | | | | 0.1 | | |

Physical properties are measured through the following Experimental example using the adhesive film manufactured in the above Examples 1 to 5 and Comparative examples 1 and 2, and results are shown in Table 2 below.

Experimental Example

1. Measuring Dielectric Constant

After putting a sample of the adhesive film manufactured in the above Examples 1 to 5 and Comparative Examples 1 and 2 on a 45 mm measuring round plate, a dielectric constant was measured using a measuring device of Exstar 6000 (DES100, manufactured by Seiko Instruments Inc.) by changing frequency from 10 kHz to 100 kHz at room temperature.

2. Measuring Release Force

After removing the low release sheet from the adhesive film manufactured in Examples 1 to 5 and Comparative examples 1 and 2, and laminating a polyethylene terephthalate film having a thickness of 100 μm, the resulting adhesive film was left at room temperature for an hour to manufacture a sample of 25 mm in width and 150 mm in length for measuring a release force. A glass to be used for measuring the release force was cleansed with ethyl acetate, and the high release sheet of the prepared sample was removed. Then, the sample was attached to the glass using a roller of 2 kg, and was left for an hour at room temperature. The measurement was performed using a tensile tester at an angle of 180° and at a release speed of 0.3 m/min.

3. Measuring Resistance in Thickness Direction

Figure 2:
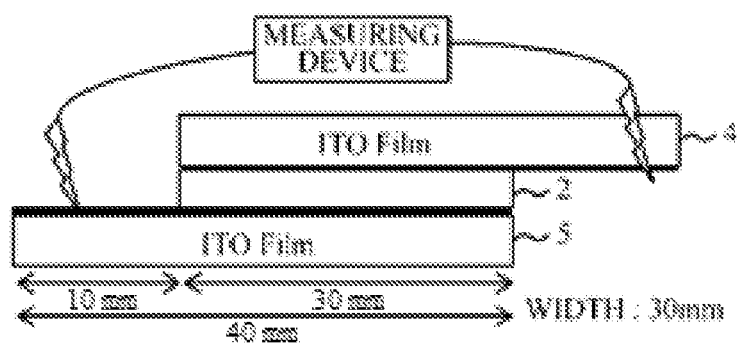
FIG. 2 is a view illustrating a method of measuring a resistance value in a thickness direction of a dielectric adhesive film for an electronic paper display device according to the present invention.

After removing a low release sheet from the adhesive film manufacture in Examples 1 to 5 and Comparative examples 1 and 2, the resulting adhesive was laminated on a part of the ITO surface or the electrode surface of an ITO film or a transparent electrode film cut to be 30 mm×40 mm or larger. After removing the high release sheet from the laminated film, another ITO film or transparent electrode film was attached to be partially opposite as shown in FIG. 2. When the adhesive film is laminated on the ITO film or transparent electrode film, a roll of 2 kg was applied once. Then, the adhesive film was left at room temperature for an hour, and both of the ITO films were grounded to measure an electrical resistance in a thickness direction.

Current of the applied voltage was measured using a low current and high resistance measuring device (High Resistance Electrometer, 6517B, manufactured by Keithley) capable of measuring resistance even from a dielectric material. In this case, after applying DC 20V, a value of converged current was read after 30 seconds, and a resistance value of the adhesive film in the thickness direction was calculated as shown in the following Equation 1.

Resistance value of adhesive film in the thickness direction($\Omega$)=20(V)/measured current(A)  (Equation 1)

4. Evaluating Reliability

After removing the low release sheet from the adhesive film manufactured in Examples 1 to 5 and Comparative examples 1 and 2, and laminating a polyethylene terephthalate film, the resulting adhesive film was left at room temperature for an hour to manufacture a sample of 100 mm×100 mm to be used for evaluating reliability, and the manufactured sample was attached to the cleansed glass using a roller of 2 kg.

After being left at room temperature for an hour, the sample was put into moisture and heat resistant condition of 60° C., and 90% RH and a heat resistant condition of 80° C. Then, it was observed for 500 hours whether or not foams were generated and edges were detached under the moisture and heat resistant condition, and reliability was evaluated according to the following criteria.

O: Foams are not generated or edges are not detached under the moisture and heat resistant condition.

X: Foams are generated or edges are detached under the moisture and heat resistant condition.

TABLE 2

|  | Dielectric constant | Release force [gf/25 mm] | Resistance value | Reliability |
| --- | --- | --- | --- | --- |
| Example 1 | 3.18 | 932 | $2.48 \times 10^8$ | O |
| Example 2 | 3.65 | 630 | $7.54 \times 10^7$ | O |
| Example 3 | 2.99 | 814 | $8.45 \times 10^8$ | O |
| Example 4 | 3.29 | 503 | $2.45 \times 10^8$ | O |
| Example 5 | 5.18 | 968 | $2.56 \times 10^5$ | O |
| Comparative example 1 | 1.98 | 1020 | $1.25 \times 10^{10}$ | O |
| Comparative example 2 | 4.69 | 106 | $6.32 \times 10^6$ | X |

As shown in Table 2 above, although the same adhesive material is used, electrical characteristics are changed depending on the thickness of the adhesive, i.e. depending on a distance between the image upper electrode containing charged electrophoretic particles and the lower electrode.

Specifically, it is confirmed that as the content of a resin for imparting dielectric characteristics used in the adhesive film increases, the dielectric constant increases, and the resistance value in the thickness direction decreases (Examples 1 to 4). By contrast, if the content of the adhesive layer of the adhesive film is too low, a dielectric constant value decreases, a value of resistance applied to the adhesive film increases (Comparative example 1). Further, if the content of a resin for imparting dielectric characteristics used in the adhesive film increases, a dielectric constant increases significantly, such that a resistance value may decrease, but a release force may be reduced, which results in degraded adhesive reliability (Comparative example 2).

In addition, the adhesive film in Example 5 is formed by additionally injecting an anti-static agent when the adhesive layer is formed, such that a release force may decrease little, and dielectric characteristics may be imparted while maintaining adhesive reliability, and as a result, a resistance value in the thickness direction may decrease.

As described above, a resin for imparting dielectric characteristics is controlled to be within 5 to 30% by weight in the adhesive film, thereby controlling a dielectric constant. Further, a resistance value of the adhesive layer in the thickness direction, i.e., a resistance value in a direction toward where an electric field is formed may be controlled to be in a range of $1.0 \times 10^4 \Omega$ to $9.9 \times 10^9 \Omega$ without changing adhesive properties and reliability of the adhesive layer. Accordingly, by minimizing loss of the applied voltage, and by freely driving charged particles, the driving voltage of a flexible display device may be least affected.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

As described above, the present invention provides an adhesive film, which is formed to attach an upper electrode coated with charged particles and a lower electrode to which voltage is applied. Further, by controlling a dielectric constant of the adhesive film, a resistance value in a thickness direction of the adhesive film, i.e., a resistance value in a direction toward where an electric field is formed may be controlled to be in a range of $1.0 \times 10^4 \Omega$ to $9.9 \times 10^9 \Omega$ without changing adhesive properties and reliability of the adhesive film.

Accordingly, an effect on the driving voltage of a flexible display device, such as a flexible light emitting diode (LED), an organic electro luminescence (EL) element, and the like, as well as an electronic paper, is minimized, with almost no loss of potential difference (voltage) when a flexible display device is driven, thereby enabling excellent driving performance of a display device even without applying a high voltage. Further, the dielectric adhesive film for an electronic paper display device of the present invention is reusable.

EXPLANATION OF REFERENCE NUMERALS

1: High release sheet
2: Adhesive layer
3: Low release sheet
4: Upper electrode
5: Lower electrode

What is claimed is:

1. A dielectric adhesive film for an electronic paper display device,
the dielectric adhesive film being formed to attach to an upper electrode coated with charged particles, and a lower electrode to which voltage can be applied, and having a dielectric constant in a range of 2.0 to 10.0,
wherein the dielectric adhesive film comprises an adhesive layer with a thickness from 4.0 μm to 50.0 μm, and
wherein the adhesive layer has an electrical resistance value in the range of $1.0 \times 10^4 \Omega$ to $9.9 \times 10^9 \Omega$ in the thickness direction of the adhesive layer,
wherein the adhesive layer contains 70 to 95% by weight of an acrylic adhesive to impart adhesive characteristics and reliability, and 10 to 20 parts of a resin per 100 parts of the acrylic adhesive for imparting dielectric characteristics to increase or to compensate for a dielectric constant,
wherein the resin for imparting dielectric characteristics is polyurethane rubber.

2. The film of claim 1, wherein the adhesive film is formed by laminating a polyester-based high release sheet, the adhesive layer formed on a silicone release coating surface of the high release sheet, and a polyester-based low release sheet formed on the adhesive layer.

3. The film of claim 2, wherein the adhesive layer contains 0.05 to 5 parts by weight of one or a mixture selected from an epoxy-based cross-linking agent, aziridine-based cross-linking agent or a multi-functional isocyanate-based cross-linking agent, with respect to 100 parts by weight of a base resin produced using an acrylate copolymer.

4. The film of claim 3, wherein the adhesive layer further contains one or more anti-static agents selected from a carbon nanotube, a conductive organic or inorganic particle, an organic or inorganic salt, and an ionic material, to impart dielectric characteristics.

5. The film of claim 2, wherein the adhesive layer further contains one or more anti-static agents selected from a carbon nanotube, a conductive organic or inorganic particle, an organic or inorganic salt, and an ionic material, to impart dielectric characteristics.

6. The film of claim 1, wherein the acrylic adhesive uses, as a base resin, an acrylate copolymer produced by copolymerizing 90 to 99.9% by weight of a monomer that does not have a cross-linkable functional group, and 0.1 to 10% by weight of a monomer having a cross-linkable functional group.

7. The film of claim 6, wherein the monomer that does not have a cross-linkable functional group is one or a mixture of two or more monomers selected from a group consisting of: methyl(meth)acrylate, ethyl(meth)acrylate, n-propyl(meth)acrylate, n-butyl(meth)acrylate, pentyl(meth)acrylate, hexyl(meth)acrylate, cyclohexyl(meth)acrylate, 2-ethylhexyl(meth)acrylate, isooctyl(meth)acrylate, decyl(meth)acrylate, dodecyl(meth)acrylate, myristyl(meth)acrylate, palmityl(meth)acrylate, stearyl(meth)acrylate, n-tetradecyl(meth)acrylate; an acrylic monomer of acrylonitrile; or a biacrylic monomer containing vinyl acetate or styrene.

8. The film of claim 7, wherein the adhesive layer further contains one or more anti-static agents selected from a carbon nanotube, a conductive organic or inorganic particle, an organic or inorganic salt, and an ionic material, to impart dielectric characteristics.

9. The film of claim 6, wherein the monomer having a cross-linkable functional group is one or a mixture of two or more monomers selected from: an acrylic monomer containing any one hydroxy group selected from a group consisting of 2-hydroxy ethyl(meth)acrylate, 2-hydroxy propyl(meth)acrylate, 4-hydroxy butyl(meth) acrylate, 6-hydroxy hexyl(meth)acrylate, 2-hydroxy ethylene glycol (meth)acrylate, and 2-hydroxy propylene glycol(meth)acrylate; an acrylic monomer containing any one carboxyl group selected from a group consisting of (meth)acrylic acid, maleic acid, and fumaric acid; or any one nitrogen-containing acrylic monomer selected from a group consisting of acrylamide, N-vinyl pyrrolidone, and N-vinyl caprolactam.

10. The film of claim 9, wherein the adhesive layer further contains one or more anti-static agents selected from a carbon nanotube, a conductive organic or inorganic particle, an organic or inorganic salt, and an ionic material, to impart dielectric characteristics.

11. The film of claim 6, wherein the adhesive layer further contains one or more anti-static agents selected from a carbon nanotube, a conductive organic or inorganic particle, an organic or inorganic salt, and an ionic material, to impart dielectric characteristics.

12. The film of claim 1, wherein the adhesive layer further contains one or more anti-static agents selected from a carbon nanotube, a conductive organic or inorganic particle, an organic or inorganic salt, and an ionic material, to impart dielectric characteristics.

* * * * *